United States Patent
Sakakibara et al.

(10) Patent No.: US 6,701,328 B1
(45) Date of Patent: Mar. 2, 2004

(54) DATABASE MANAGEMENT SYSTEM

(75) Inventors: Atsushi Sakakibara, Kobe (JP); Mikio Oda, Nishinomiya (JP)

(73) Assignee: Media Fusion Co., Ltd., Hyogo (JP)

( * ) Notice: Subject to any disclaimer, the term of this patent is extended or adjusted under 35 U.S.C. 154(b) by 227 days.

(21) Appl. No.: 09/750,856

(22) Filed: Dec. 29, 2000

(30) Foreign Application Priority Data

Jan. 6, 2000 (JP) ........................................ 2000-000867

(51) Int. Cl.$^7$ ........................... G06F 12/00; G06F 17/30
(52) U.S. Cl. ........................ 707/200; 707/4; 707/104.1; 707/201; 707/202
(58) Field of Search ............................. 707/3, 5, 7, 10, 707/200, 4, 6, 104.1, 102; 709/203, 206, 218

(56) References Cited

U.S. PATENT DOCUMENTS

| | | | | |
|---|---|---|---|---|
| 4,574,346 A | * | 3/1986 | Hartung | 711/117 |
| 4,839,799 A | * | 6/1989 | Takahashi et al. | 364/200 |
| 5,018,060 A | * | 5/1991 | Gelb et al. | 707/205 |
| 5,991,876 A | * | 11/1999 | Johnson et al. | 713/200 |
| 6,105,022 A | | 8/2000 | Takahashi et al. | 707/3 |
| 6,263,332 B1 | * | 7/2001 | Nasr et al. | 707/5 |
| 6,366,934 B1 | * | 4/2002 | Cheng et al. | 707/513 |
| 2002/0116371 A1 | * | 8/2002 | Dodds et al. | 707/3 |
| 2003/0188288 A1 | * | 10/2003 | Kobayashi et al. | 716/19 |

FOREIGN PATENT DOCUMENTS

| | | | | |
|---|---|---|---|---|
| EP | 0984363 A2 | * | 8/2000 | 15/173 |
| EP | 1089195 A1 | * | 4/2001 | 17/30 |
| JP | 2-297284 | | 12/1990 | |
| JP | 4-84271 | | 3/1992 | |
| JP | 6-28403 | | 2/1994 | |
| JP | 10-240752 | | 9/1998 | |

* cited by examiner

*Primary Examiner*—Charles Rones
*Assistant Examiner*—Jacques Veillard
(74) *Attorney, Agent, or Firm*—Merchant & Gould P.C.

(57) ABSTRACT

This embodiment of the invention has a container 26c within which multiple groups of data, each optionally including one or more attributes (or attribution items), are stored without destroying their relational structure. A group of data consisting of a single XML data unit is referred to here as a data block. Index data for search 26i is the auxiliary data for indexing purposes. On receiving a search command, the CPU 23 obtains the index data from the index 26i and selects the matching groups of data from the container 26c. By storing the index data and structure for each attribute, and searching the container 26c with reference to the index and structure data stored, XML data can be stored without destroying the format and still be searched at high speed.

1 Claim, 14 Drawing Sheets

FIG.3A

```
<EMPLOYEE>
    <NAME>ICHIRO YAMADA</NAME>
    <ORGANIZATION>
        <DEPARTMENT>SALES
            <SECTION>FIRST SECTION</SECTION>
        </DEPARTMENT>
    </ORGANIZATION>
    <POSITION>MANAGER</POSITION>
    <PHONE NUMBER(DIRECT)>03-1234-4567</PHONE NUMBER(DIRECT)>
<EMPLOYEE>
```

FIG.3B

```
<EMPLOYEE>
    <NAME>JIRO TANAKA</NAME>
    <ORGANIZATION>
        <DEPARTMENT>ENGINEERING DEPARTMENT
            <SECTION>SECOND SECTION</SECTION>
        </DEPARTMENT>
    </ORGANIZATION>
    <POSITION>DEPARTMENT MANAGER</POSITION>
    <PHONE NUMBER(DIRECT)>03-1234-4444</PHONE NUMBER(DIRECT)>
<EMPLOYEE>
```

```
<EMPLOYEE>
    <NAME>TARO SUZUKI</NAME>
    <ORGANIZATION>
        <DEPARTMENT>SALES
            <SECTION>THIRD SECTION</SECTION>
        </DEPARTMENT>
    </ORGANIZATION>
    <POSITION>SENIOR STAFF</POSITION>
    <PHONE NUMBER(DIRECT)>03-1234-XXXX</PHONE NUMBER(DIRECT)>
<EMPLOYEE>
```

FIG.10

```
<EMPLOYEE>
    <NAME>GORO SATO</NAME>
    <ORGANIZATION>
        <DEPARTMENT>SALES
            <SECTION>THIRD SECTION
                <SUBSECTION>FIRST SUBSECTION</SUBSECTION>
            </SECTION>
        </DEPARTMENT>
    </ORGANIZATION>
    <POSITION>SENIOR STAFF</POSITION>
    <PHONE NUMBER(DIRECT)>03-1234-XXXX</PHONE NUMBER(DIRECT)>
    <PHONE NUMBER(MOBILE)>090-0321-4567</PHONE NUMBER(MOBILE)>
</EMPLOYEE>
```

FIG.14

```
<EMPLOYEE>
    <NAME>ICHIRO YAMADA</NAME>
    <ORGANIZATION>
        <DEPARTMENT>
            <SECTION>FIRST SECTION</SECTION>
        </DEPARTMENT>
    </ORGANIZATION>
    <POSITION>MANAGER</POSITION>
    <PHONE NUMBER(DIRECT)>03-1234-4567</PHONE NUMBER(DIRECT)>
    <PHONE NUMBER(MOBILE)>090-1234-4444</PHONE NUMBER(MOBILE)>
</EMPLOYEE>
```

DATABASE MANAGEMENT SYSTEM

CROSS REFERENCE TO RELATED APPLICATIONS

All the contents disclosed in Japanese Patent Application No. 2000-000867(filed on Jan. 6, 2000), including specification, claims, drawings and abstract and summary are incorporated herein by reference in its entirety.

BACKGROUND OF THE INVENTION

1. Field of the Invention

This invention relates to a database management system, and, more particularly, to the system capable of relaxing constraints on the structure of data stored in the database.

2. Description of the Related Art

In general, there are multiple records in a database management system and each record consists of multiple fields. Data structure (such as data format, data length and so on) of such fields is predetermined by the structure of the database. Thus, a high-speed data search can be carried out on the fields of the previously defined structures. Recently, extensible markup language (XML) data is becoming popular as structure descriptive data. Data stored in a system can be attributed by the XML information so as to indicate which fields it belongs to, i.e., so that the hierarchical structure can be automatically extracted. For example, a computer stores an item "Ichiro YAMADA", and another item "manager" respectively into fields "name" and "position" by referring to tags in each item given XML data shown in FIG. 3A.

The database management system, however, has the following problems to be solved. If the record length is fixed, both the number and the length of fields in each record are fixed. Therefore, the data structures need to be rebuilt when new fields are added and/or the field lengths are varied. In other words, data contained in added attributes is discard even when XML attributes containing the new data are provided. Usually, a database management system manages a huge amount of data so that many extremely complicated processes need to be carried out for restructuring the entire database even if it is for just one record out of hundreds of thousands of records managed by the system.

Furthermore, data (such as null) adjusted to the new data structure needs to be entered even when no data exists for the field so that this causes unused regions therein.

In order to solve such problems, even if each of the records is defined to have variable length, the length of each field may be variable, but the number of field(s) in each of the records must be predefined. As a consequence, no additional field can be added.

In other words, the conventional database management systems do not employ a structure sufficiently supporting the advantages of XML data by which addition of attributes to the data itself can be performed. Although, XML data can describe a relational structure of each item using the tag described above, such relational structure can not be stored as it is by the conventional database management system.

SUMMARY OF THE INVENTION

It is an object of the present invention to solve the above-mentioned problems and to provide a database management system having sufficient flexibility to make use of the advantages of descriptively attributed data.

1) In accordance with one aspect, the present invention provides a database management system comprising:

data group storage means for storing multiple groups of data including attribution items having predetermined structure, without destroying the structure of the data stored;

auxiliary data storage means for storing auxiliary index data for the groups of data with attribution items, showing the location of the data for search purposes; and append data group processing means for appending newly provided data, appending the groups of data to the stored data, appending the relevant location data for multiple attribution items when auxiliary search data already exists matching the attribution items of the newly appended groups of data, but appending the data of the newly provided attribution items as well as relevant location data when matching auxiliary search data does not exist.

4) In accordance with another aspect, the present invention provides a database management system comprising:

data group storage means for storing multiple groups of data including attribution items having predetermined structure, without destroying the structure of the data stored;

auxiliary data storage means for storing auxiliary data for said groups of data with attribution items, showing the location of the data for search purposes; and searching means for searching data stored by the data group storage means with reference to auxiliary data for search stored by the auxiliary data storage means when a search command including attribution items to be searched is provided.

6) In accordance with another aspect, the present invention provides a database management system using a computer for managing XML block data including optionally multiple attribution items, the structure of each of the attribution items being formed according to a tree structure, wherein the system controls the storing process so that the XML block data is stored into a block of primary storage region per each of the XML block data while maintaining the structure of the XML block data, and the system controls the storing process so that location data for locating the stored XML block data is stored into a secondary storage region, the location data showing the location of the XML block data for search purposes, and wherein the following processing is performed when new XML block data is entered;

a) appending the new XML block data into the primary storage region while maintaining its tree structure, and b) among the attribution items of the newly provided XML block data, for those which match the properties of the index data, the location information of the attribution items is stored in the secondary storage region, and for those which do not have attribution items in the stored index data, new attribution items are stored in the secondary storage region along with the location data for the new attribution items.

8) In accordance with another aspect, the present invention provides a method of managing data using a computer comprising the steps of:

storing in a primary storage region, multiple groups of data including attribution items having predetermined structure, without destroying the structure of the data stored;

storing in a secondary storage region, auxiliary data for the data groups with attribution items, showing the location of the data for search purposes; and accepting into the primary storage region, newly entered groups of data with attribution items, appending the newly entered data groups, matching attribution items from the data groups, appending auxiliary data for the attribution items, appending location data for search purposes, and appending auxiliary data for attribution items not present.

9) In accordance with another aspect, the present invention provides a method of searching data using a computer comprising the steps of:

storing in a primary storage region, multiple groups of data including attribution items having predetermined structure, without destroying the structure of the data stored;

storing in a secondary storage region, auxiliary data for the data groups with attribution items, showing the location of the data for search purposes; and searching multiple groups of data stored in the primary storage region with reference to auxiliary search data when a search command including attribution items to be searched is provided.

12) In accordance with another aspect, the present invention provides a data storing medium including a data structure comprising the following regions:

A) a data group storage region for storing multiple groups of data including attribution items having predetermined structure, without destroying the structure of the data stored; and B) an auxiliary data storage region for storing auxiliary data for the groups of data with attribution items, showing the location of the data for search purposes.

The term "attribution item" is generally referred to in the literature as "attribute" or "attribution" indicating an explanatory data item, or property, or other data item appended to the principle data item.

Other objects and features of the present invention will be more apparent to those skilled in the art on consideration of the accompanying drawings and following specification, in which are disclosed several exemplary embodiments of the present invention. It should be understood that variations, modifications and elimination of parts may be made therein as fall within the scope of the appended claims without departing from the spirit of the invention.

BRIEF DESCRIPTION OF THE DRAWINGS

FIGS. 3A and 3B are views showing examples of XML data for input;

FIG. 10 is another example of XML input data to be added to the database;

FIG. 14 is a view showing another example of XML data input data to be added to the database.

DETAILED DESCRIPTION OF THE INVENTION

1. Description of Functional Block Diagram

Figure 1:
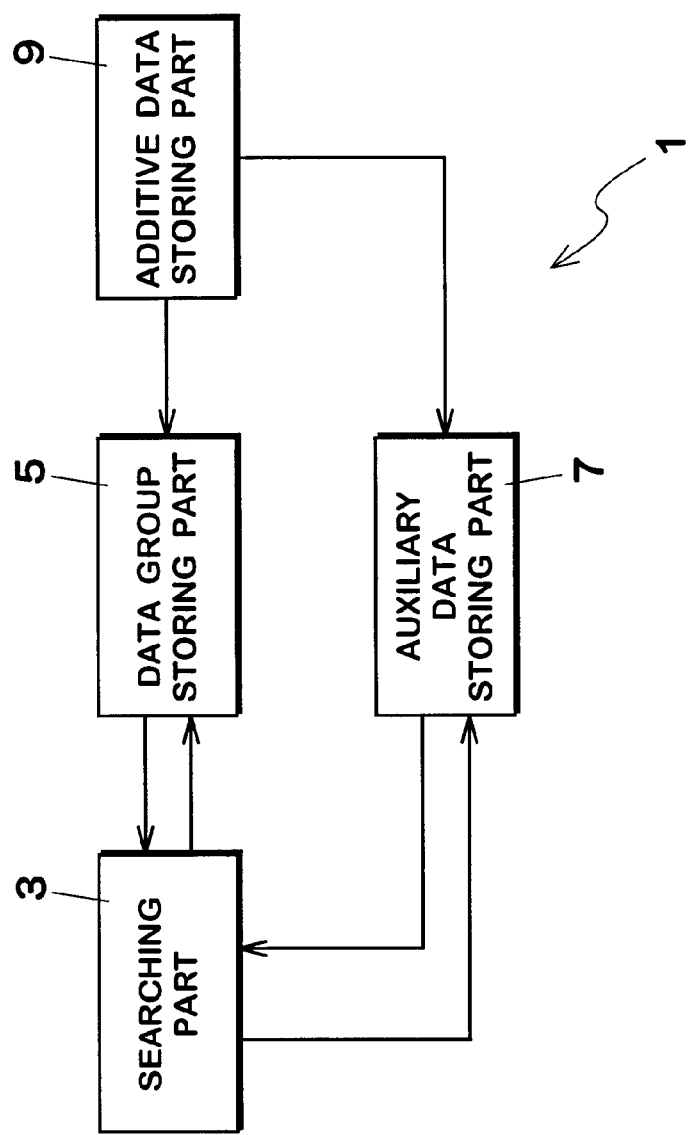
FIG. 1 is a functional block diagram of a model database management system 1 according to the present invention.

An embodiment of the present invention will be described with reference to drawings. A database management system 1 shown in FIG. 1 comprises a data group storing part 5, an auxiliary data storing part 7, a searching part 3, and append data processing part 9.

The data group storing part 5 stores multiple data groups in which the data for multiple attribution items (attributes) are stored and each of the attributes is stored according to a predetermined structure without destroying the structure. The auxiliary data storing part 7 stores auxiliary data for searching which records location (index) information for data belonging to each of the attributes of the several data groups, aggregating by attribute. The searching part 3 searches data stored in the data storing part 5 with reference to auxiliary data for searching stored in the auxiliary data storing part 7 when a search command including attributes to be searched is submitted.

In this way, a high-speed data search on data groups structurally composed can be carried out. Also, a high-speed data search can be performed because the auxiliary data for searching is stored by aggregation according to the attribute.

When new data groups containing data with multiple attributes are provided, the append data processing part 9 appends the newly provided data groups therein while adding location information for the data of attributes matching the attributes of the auxiliary data for searching for the newly added data groups. The append data processing part 9 also stores attributes not existing in the attributes of the auxiliary search data as new attributes while adding location information for data of the attributes in the auxiliary data storing part 7. In this way, multiple data groups in which the structure of each of the attributes is predetermined are stored without destroying the structure. All the appended data groups can also be stored without destroying their structures.

2. Hardware Structure

Figure 2:
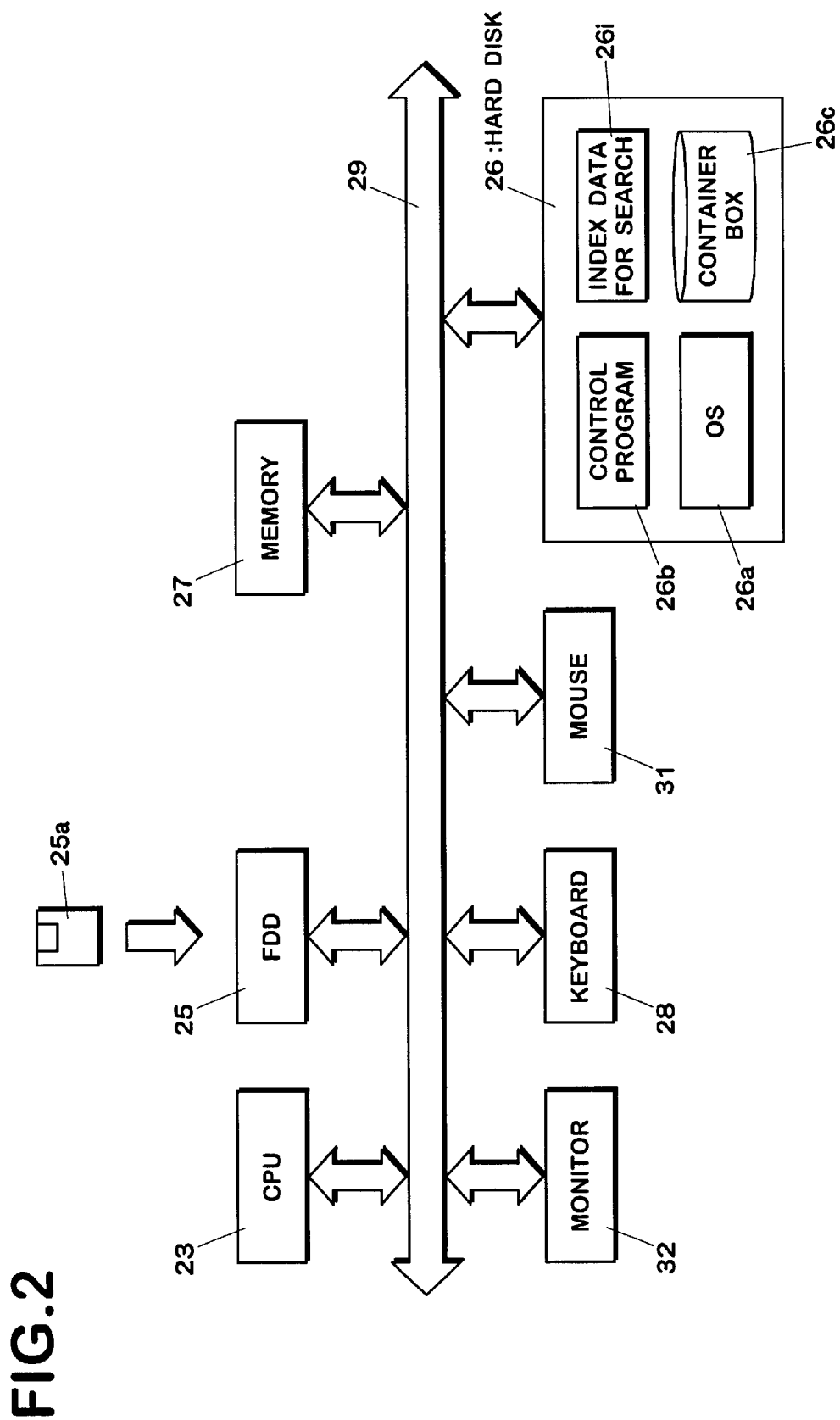
FIG. 2 is a diagram showing example hardware, including CPU, for implementing the model database system (1) described in this application.

FIG. 2 is a view illustrating an example of the hardware structure of the database management system 1 shown in FIG. 1 using a CPU. The database management system 1 is comprised of a CPU 23, a memory 27, a hard disk 26, flexible disk drive (FDD) 25, a monitor 32, a keyboard 28, a mouse 31, and bus line 29.

The CPU 23 controls other parts via the bus line 29 according to a program stored in the hard disk 26. The program is read out from a flexible disk 25a storing the program with the FDD 25 and installed into the hard disk 26. The control program may be installed into the hard disk 26 by reading out from a computer readable storing medium which substantially embodies the program other than a flexible disk, such as CD-ROM, IC-card and so on. The program may also be downloaded into the hard disk 26 via a communication line.

In this embodiment, the program stored in the flexible disk is executed with the computer indirectly by installing the program into the hard disk 26 from the flexible disk. Alternatively, the program stored in the flexible disk may be executed directly with the computer using the program read out from the FDD 25. This embodiment is not limited to a program executable under as-is condition after installation thereof but also includes a program requiring some conversions in form (e.g. a compressed program which must be decompressed and so on), and a program capable of executing in combination with other module(s).

The hard disk 26 stores the control program and an operating system (OS). For the operating system, Windows NT™ by Microsoft™ might be employed.

Figure 4:
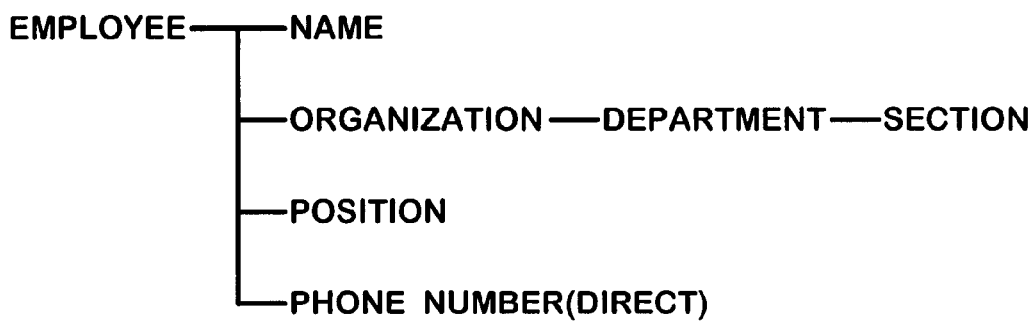
FIG. 4 is a structural diagram showing the tree structure implicit in the XML data of FIGS. 3A and 3B.
Figure 5:
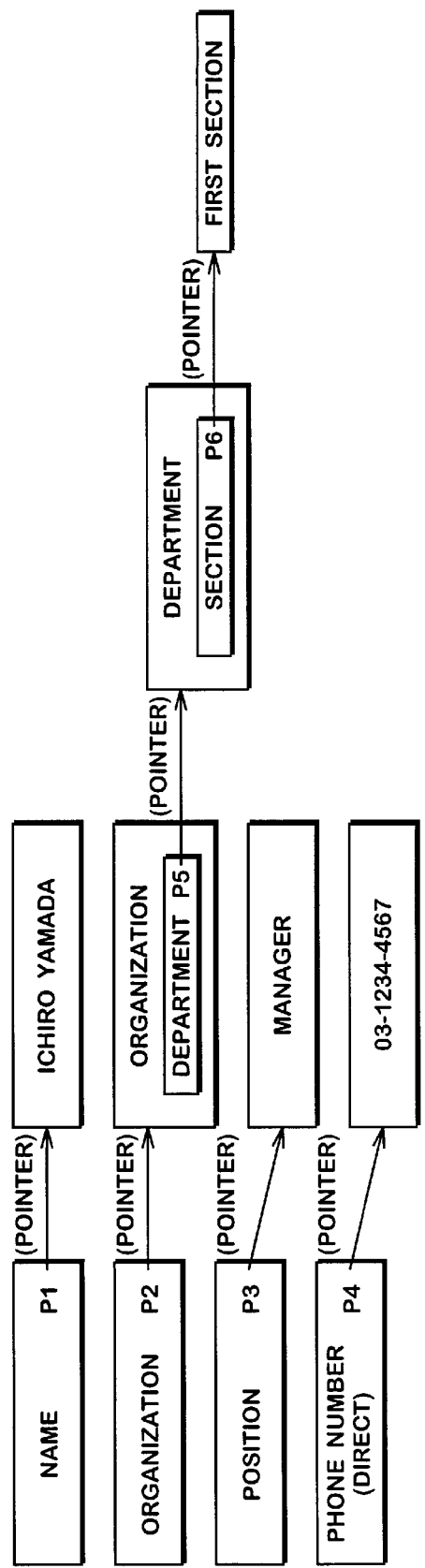
FIG. 5 is a diagram showing the relationships of the data elements of FIG. 3A stored as block data.

Furthermore, the hard disk 26 stores a container box 26c and index data for search 26i. Within the container 26c, multiple groups of XML data, each with attributes such as shown in FIGS. 3A and 3B, are stored without destroying their relational structure. In concrete form, the relational structure of each group of XML data shown in FIG. 3A can be represented by a tree structure as illustrated in FIG. 4. In order to store such a tree structure as it is, pointers are stored indicating the location where actual data for each attribute is stored as shown in FIG. 5. For example, a pointer P1 indicating the start address of actual data "Ichiro YAMADA" is stored for an attribute "name". The attribute "department" belongs to another attribute "organization", and the actual data of the attribute "department" is stored in a region referenced by pointer P5 because relational structures of each attribute is represented as a tree structure in this embodiment. In addition, an attribute "section" is stored in the region referenced by the pointer P5 and the actual data thereof is stored in a region referenced by the pointer P6. In this embodiment, one data group consisting of XML data is referred to as block data. Multiple blocks of data are stored in the container box 26c.

"Ichiro YAMADA, Goro SATO "et. al. in this application are names used for explanatory purposes.

Figure 7:
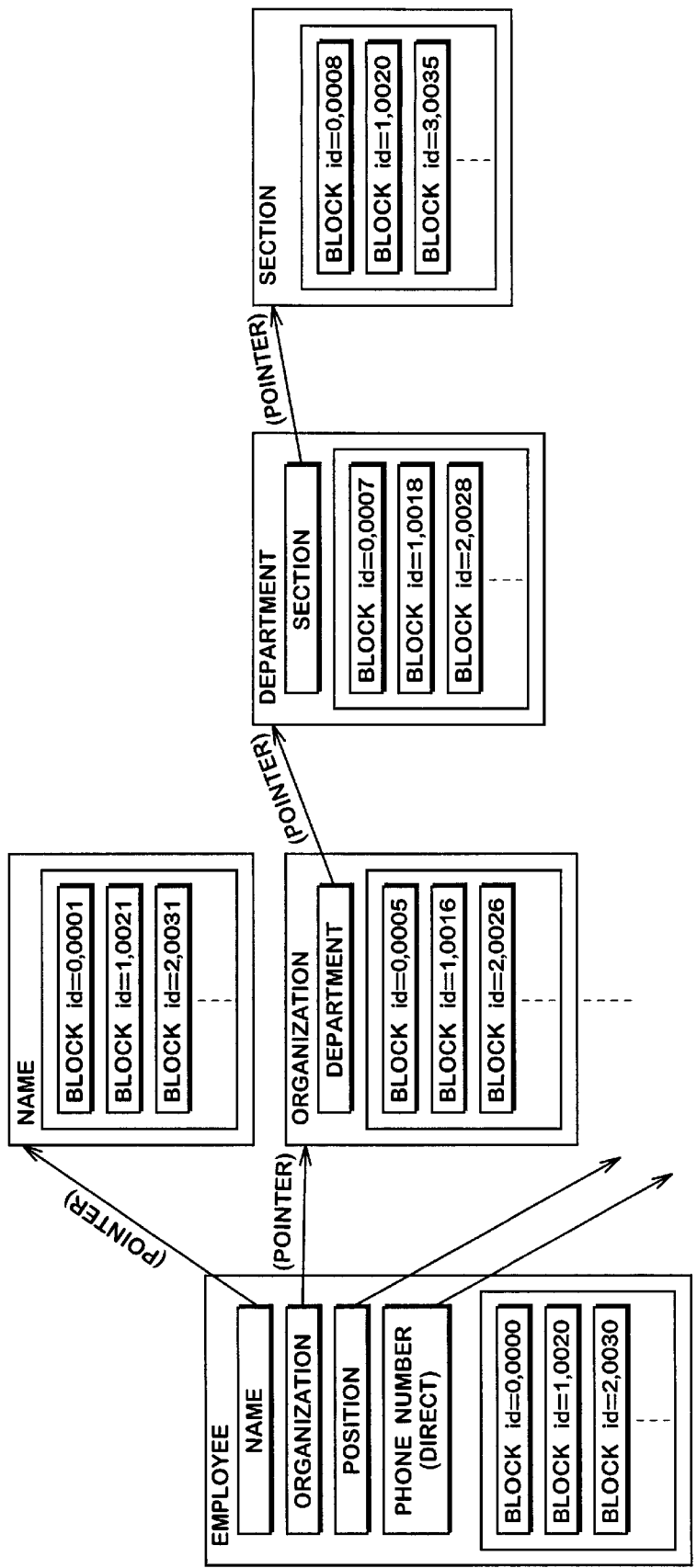
FIG. 7 is a diagram of the index data for searching.

Details of the index data for search 26i will be described with reference to FIG. 7. This index data is index data for searching multiple blocks of data stored in the container box 26c in integrated reduced tree structures which contain each attribute of the multiple blocks of data stored in the container box 26c. Within the attributes in the integrated tree structure, both container id of actual data of the block data having data therein and the start address (index information) are stored, aggregated by attribute.

Figure 6A:
FIGS. 6A through 6D are diagrams showing an integrated tree structure.
Figure 6B:
Figure 6C:
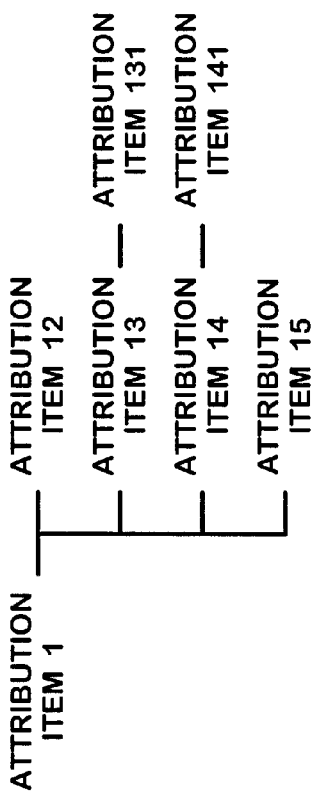
Figure 6D:

An integrated reduced tree structure is a tree structure integrating the several tree structures of the block data by performing the logical add (OR) operation across all the block data. For example, the tree structure illustrated in FIG. 6D indicates the resulting tree structure when the tree structures illustrated in FIGS. 6A through 6C are integrated and reduced.

Within each of the attributes in the integrated tree structure, both actual data block id of block data having data therein and the start address (index information) are stored. For example, in an attribute "name" of an integrated tree structure, search data, including both the block id=0 of the block in which the actual data "Ichiro YAMADA" of the attribute "name" is stored and address 0001 of the container box, both the block id =1 of the block in which the actual data "Jiro TANAKA" of the attribute "name" is stored and address 0021 of the container box, and so on might be stored. How to use the search data will be described later.

There are cases that no data relevant to an attribute is stored in a certain block data because the data structure is a tree structure integrating and reducing the tree structures of all the block data. For example, when just "Administration Department" exists and no data relevant to the attribute "section" is in data having its data id =2, no index for the block is stored because no data having block =2 exists in the attribute "section".

Thus, the structure of the each attribute in block data stored in the container box 26c is represented by a tree structure, and index data for searching block data containing data in each of attributes is stored, aggregated by attribute.

Calculated values and so on are stored in the memory 27. The keyboard 28 and the mouse 31 are used as input means for inputting various data and/or commands. On the monitor 32, the results of search are displayed.

3. Flow Diagram (3.1) Append Data Storing Process

Figure 8:
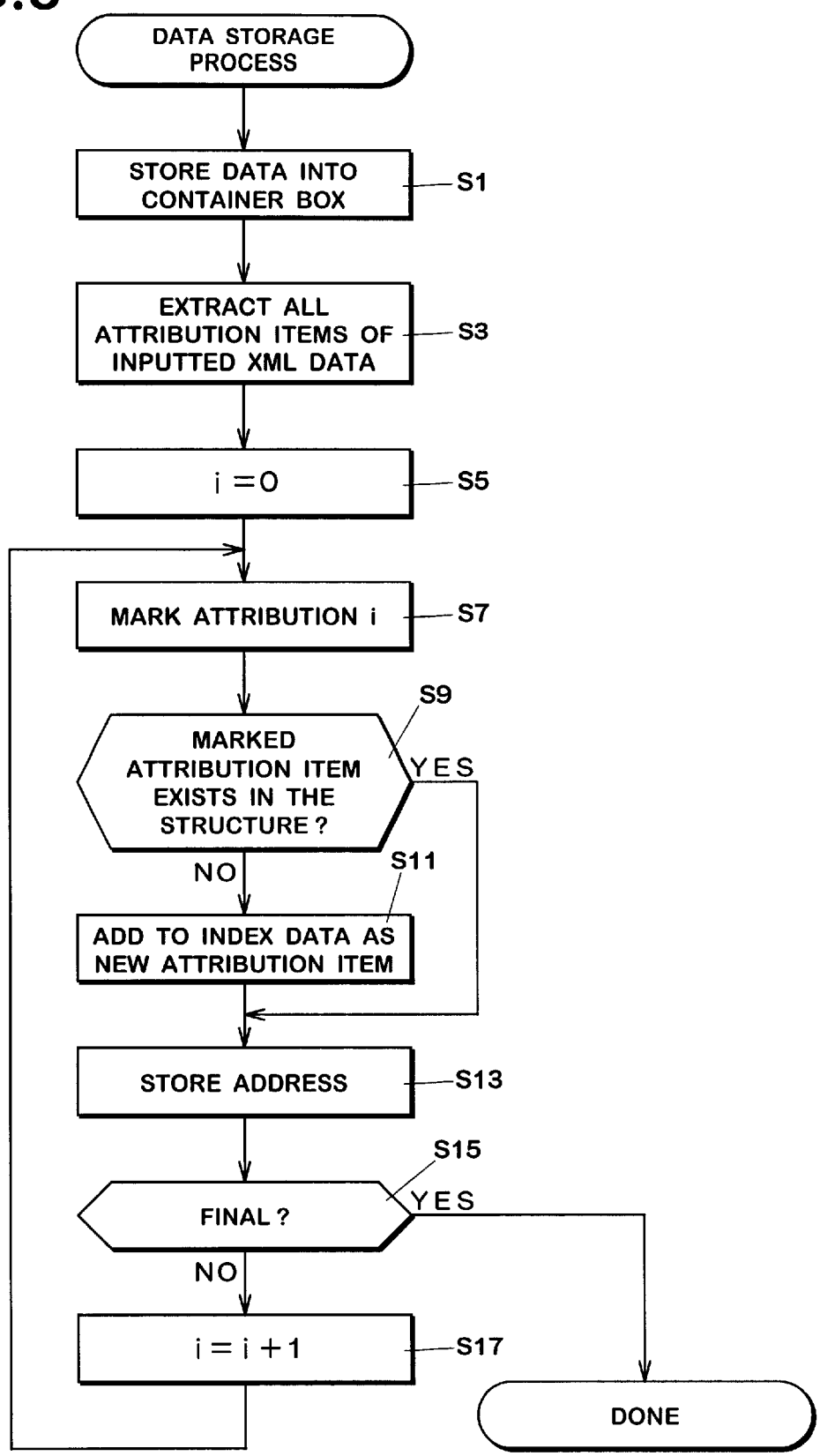
FIG. 8 is a flowchart of the data storage process.
Figures 9A, 9B:
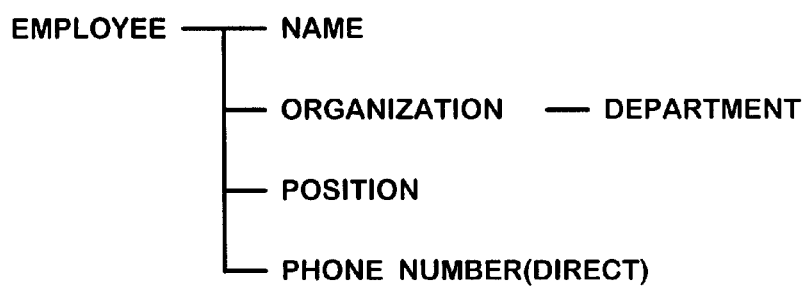
FIGS. 9A and 9B are examples of XML input data to be added to the database.

A process for storing data into the hard disk 26 will be described with reference to FIG. 8. In the append data storing process, new block data and index data are appended respectively to the container box 26c and the index search data 26i. This description assumes that the XML data shown in FIG. 9A is provided when the integrated tree structure illustrated in FIG. 4 has already been stored. The CPU 23 functions so as to store the XML data provided into the container box 26c without destroying the structure of its attributes (step S1). In this way, one block of data is appended.

The CPU 23 extracts a tree structure as shown in FIG. 9B from the XML data (step S3). The extraction can be realized by extracting relational structures of the tags in the XML data. For example, it is apparent from FIG. 9A that there are subordinate tags "name", "organization", "position" and "phone number" under a tag "employee" and there is another subordinate tag "position" under the tag "department", in addition, another subordinate tag "section" is located under the tag "department". In this way, tree structures of each attribute can be extracted as shown in FIG. 9B.

Subsequently, the CPU 23 initializes processing number i (step S5 of FIG. 8) to mark the i-th attribute (step S7 of FIG. 8). Then, the CPU 23 determines whether any attributes already exist in the integrated tree structure for the marked attribute (step S9 of FIG. 8). In the case shown, the data "Taro SUZUKI" exists in the container box for the attribute "name" so the start address is stored with the corresponding block id of the attribute name from the integrated tree structure and the process proceeds to step S13.

Then, the CPU 23 determines whether any marked attributes remain to be considered (step S15 of FIG. 8), if so, the CPU 23 increments the processing number i (step S17 of FIG. 8) and proceeds to step S7. In this case, since data for all the remaining attributes "organization", "department", "section", "position" and "phone number" exists the process stores just new address data as described above (step S13 of FIG. 8). The process ends when all the items have been considered.

Determination of the existence of a specific attribute depends on whether the superordinate attributes thereof differ from one another. In other words, existence of the specific attribute may be detected when superordinate attributes are fully matched. As a counter example, since the attribute "section" is a subordinate attribute for the attribute "department", it may be determined that it would differ from an attribute "section" under the attribute organization".

In this way, the new XML data is stored without destroying its relational structure in the container box 26c as well as being additionally stored in the search index data 26i.

Next, the process performed when an attribute not currently present is provided will be described using concrete examples. When the XML data shown in FIG. 10 is provided for the stored integrated tree structure illustrated in FIG. 7A, the CPU 23 stores the XML data thus provided into the container box 26c without destroying the structure of its attributes (Step S1 of FIG. 8). The identical process is performed regardless of the existence or nonexistence of attributes.

Figure 11:
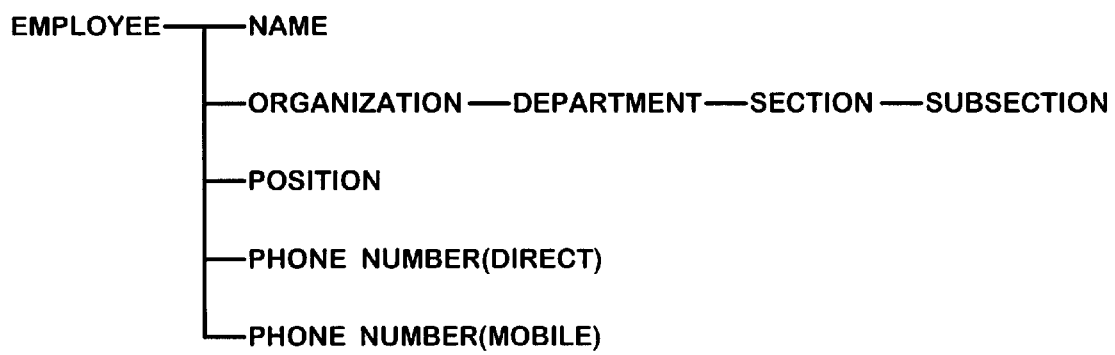
FIG. 11 is a diagram of the structure of the XML data attributes of FIG. 10.

Subsequently, the CPU 23 extracts a tree structure shown in FIG. 11 from the provided XML data. (step S3 of FIG. 8). Then, the CPU23 initializes processing number i (step S5 of FIG. 8) to mark the i-th attribution (step S7 of FIG. 8). Thereafter, the CPU 23 determines whether marked attribute(s) exists in the integrated tree structure (step S9 of FIG. 8). In this case, the process proceeds to step S13 and stores both the start address of data "Goro SATO" in the container box and the block id thereof into an attribute "name" of the integrated tree structure because the attribute "name" exists in the integrated tree structure illustrated in FIG. 4.

The CPU 23 performs similar processing for the attributes "organization", "department", and "section". As for the attribute "subsection", this attribute is appended to the integrated tree structure shown in FIG. 7 in step S9 of FIG. 8 because no corresponding attribute previously existed in the integrated tree structure (step S11 of FIG. 8).

Figure 12:
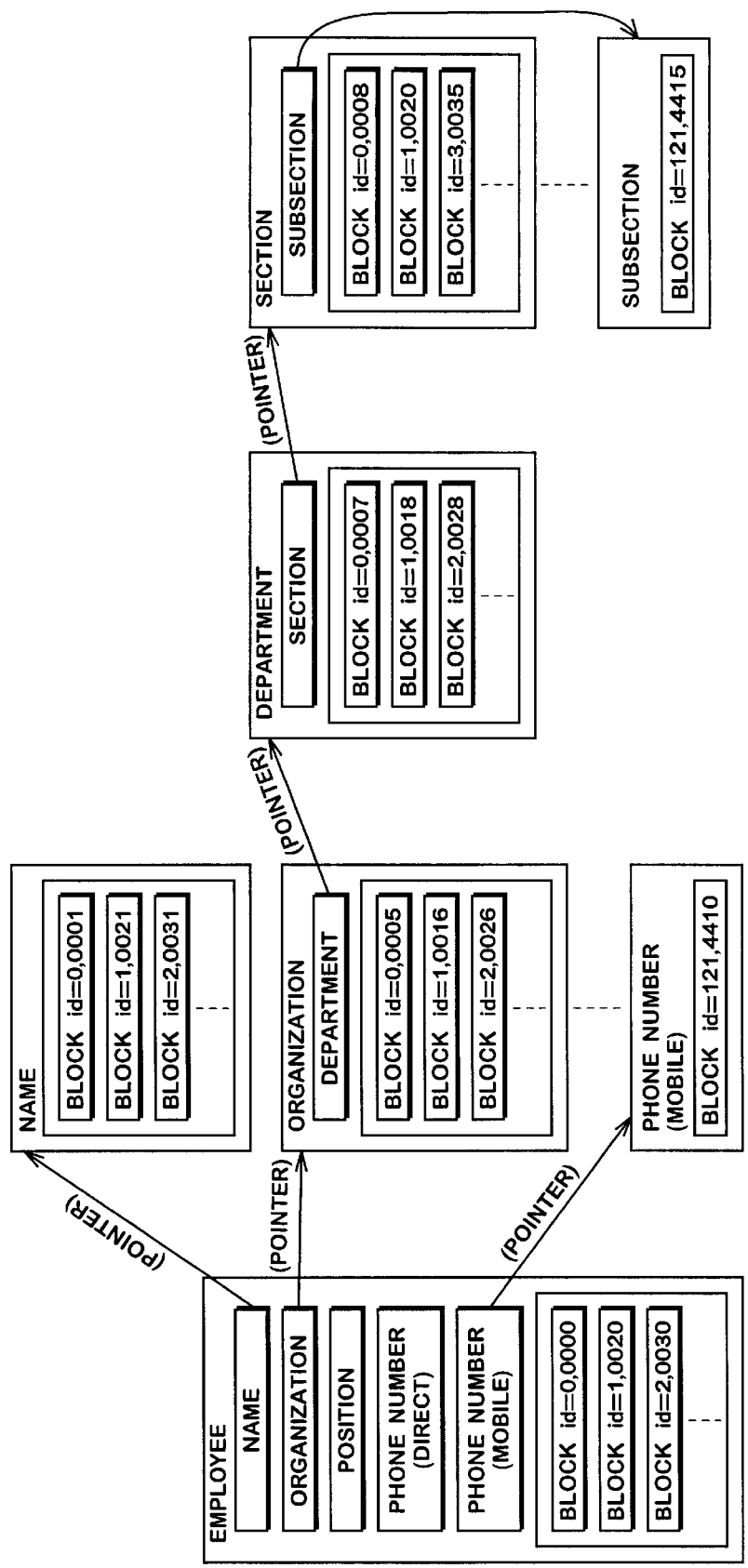
FIG. 12 is a view showing the structure of the search index after data is appended.

Similarly, another attribute "phone number (mobile phone) "is added thereto. In this way, both the attributes "subsection" and "phone number (mobile phone) "are added to the integrated tree structure as illustrated in FIG. 12.

(3.2) Data Search Processing

The process for searching data will be described with reference to a flow diagram shown in FIG. 13. The CPU 23 acquires the structure of an integrated tree structure from the index search data 26i when a search command is provided (step S21 of FIG. 13). Here, description will be made under the assumption that a search command is provided specifying the name of employees belonging to the first section of the sales department being extracted.

The CPU 23 refers to the integrated tree structure and determines that the attribute to be searched for is subordinate to the attribute "section"subordinate to the attribute "department" subordinate to the attribute "organization", and reads out the index data, "block id=0, address 0008", "block id=1, address 0020", and "block id=3, address 0035", stored in the specified attribute "section". The CPU 23 reads out the actual data from the index data for the container box 26c by conducting a search using the index data (step S25 of FIG. 13).

Figure 13:
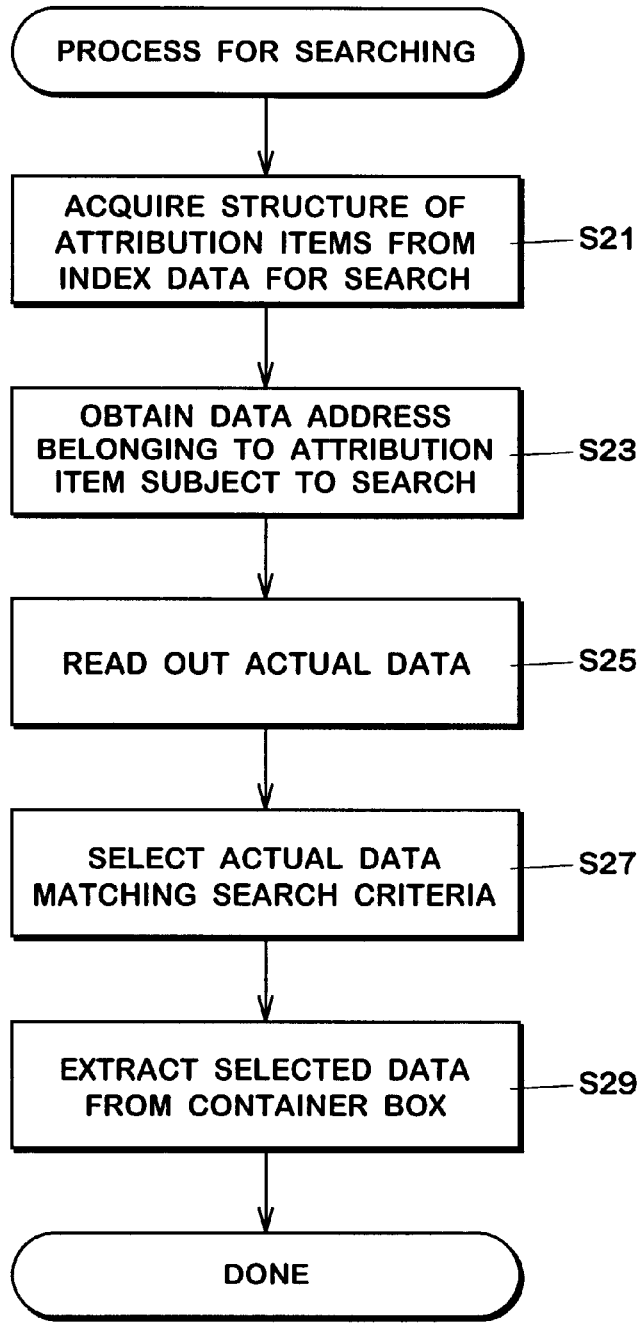
FIG. 13 is a flowchart of the search process.

The CPU 23 selects the data matching the search criteria out of the actual data thus read out (step S27 of FIG. 13). It is sufficient to specify the block id obtained from the selected data. Concretely, the data is extracted from the container box using both block ids of index data stored in the attribute "name" of the index search data and the start address of the blocks matching the specified block id.

In this embodiment, the CPU 23 stores the structure of each attribute and searches the data stored in the container box 26c with reference to the attribute structure stored. Thus, a high-speed search can be conducted while storing XML data without destroying its structure.

Search can also be conducted even when a superordinate attribute of the attribute to be searched is not provided because the whole-integrated tree structure is stored.

Step S21 can be omitted when the superordinate attribute and the attribute to be searched is provided with the search command.

Data can be deleted by conducting a reverse process to the abovedescribed process. That is, a process of deleting data from the container box and that of deleting the data matched out of the index for search may be carried out.

In order to append new attribute(s) to the block data already stored, just provide XML data added new attribute(s) after dumping the data matched. Other than such way, it is possible to just add an attribute(s), which should be added while keeping the existing attributes and their values. For example, in case of adding a new attribute "mobile phone" for an employee "Ichiro YAMADA", the following process is performed. The CPU 23 conduct a search for judging whether or not the identical blocks are existed in the container box when VML data shown in FIG. 14 is provided. If any identical block data exists therein, the CPU extracts an attribute differ among the block data and adds the new attribute to one of the block data.

Thus, the structure of XML data, not the record format suitable for conventional search, is used for data format of the database under as-is condition, and index for search indicating the location of data per attributes is employed in this embodiment. In this way, a database management system having a sufficient flexibility in varying data format can be provided. Further, it is possible to provide a database management system suitable for data management of data groups having a tree structure in the attribute of each item.

Although XML data have been used in the above descriptions as data with structurally specified attributes, any other data format with structurally specified attributes can be used.

A part of the programs executed in the above description may be performed by the operating system (OS). In other words, these programs can be executed by themselves or may be performed a sharing manner with the operating system. In this embodiment, the CPU 23 executing programs is used to realize the functions illustrated with FIG. 1. Alternatively, a part of the functions may be realized with hardware. The proportions between the hardware and software can be determined arbitrary.

1) In accordance with characteristics of the present invention, there is provided a database management system comprising: A) data group storage means for storing multiple groups of data including attribution items having predetermined structure, without destroying the structure of the data stored; B) auxiliary data storage means for storing auxiliary index data for the groups of data with attribution items, showing the location of the data for search purposes; and C) append data group processing means for appending newly provided data, appending the groups of data to the stored data, appending the relevant location data for multiple attribution items when auxiliary search data already exists matching the attribution items of the newly appended groups of data, but appending the data of the newly provided attribution items as well as relevant location data when matching auxiliary search data does not exist.

Thus, data groups in which each of the attribution items is defined structurally can be stored without destroying the structure. All the appended data groups can also be stored without destroying their structures. Furthermore, a high-speed search for data containing a specific attribution item can be carried out because auxiliary data for searching is stored aggregating by attribution item. Consequently, a database management system, capable of exploiting the characteristics of extendably attributable data, where attribution items may be appended to any group of data, can be provided.

3) Also, in accordance with characteristics of the present invention, there is provided a database management in which the structure of each of the attribution items is formed according to a tree structure. Therefore, data groups containing attribution items in a tree structure can be managed as a database.

4) Further, in accordance with characteristics of the present invention, there is provided a database management system comprising: A) data group storage means for storing multiple groups of data including attribution items having predetermined structure, without destroying the structure of the data stored; B) auxiliary data storage means for storing auxiliary data for said groups of data with attribution items, showing the location of the data for search purposes; and C) searching means for searching data stored by the data group storage means with reference to auxiliary data for search stored by the auxiliary data storage means when a search command including attribution items to be searched is provided. In this way, a high-speed data search for desired data existing in data groups in which each of the attribution items is defined structurally can be performed by conducting the search using the auxiliary data for searching even when data groups constructed under a certain structure are stored as they are.

5) In accordance with characteristics of the present invention, there is provided a database management system, wherein the auxiliary data storage means stores the structure of each of the attribution items, and wherein the searching means performs a search for data stored in the data group storing means with reference to the structure of each of the attribution items. A high-speed search can be performed even when only attribution item(s) for search are provided as a search command.

6) Also, in accordance with characteristics of the present invention, there is provided a database management system using a computer for managing XML block data including optionally multiple attribution items, the structure of each of the attribution items being formed according to a tree structure, A) wherein the system controls the storing process so that the XML block data is stored into a block of primary storage region per each of the XML block data while maintaining the structure of the XML block data, and the system controls the storing process so that location data for locating the stored XML block data is stored into a secondary storage region, the location data showing the location of the XML block data for search purposes, and B) wherein the following processing is performed when new XML block data is entered; a) appending the new XML block data into the primary storage region while maintaining its tree structure, and b) among the attribution items of the newly provided XML block data, for those which match the properties of the index data, the location information of the attribution items is stored in the secondary storage region, and for those which do not have attribution items in the stored index data, new attribution items are stored in the secondary storage region along with the location data for the new attribution items. Thus, XML block data with multiple attribution items stored in a tree structure can be stored without destroying the structure thereof. All the appended data groups can also be stored without destroying their structures. Furthermore, a high-speed search for data containing a specific attribution item can be carried out because index data for searching is stored aggregated by each attribution item. Consequently, a database management system, capable of exploiting the characteristics of XML data, which can append attributions to each group of data, can be provided.

8) Further, in accordance with characteristics of the present invention, there is provided a method of managing data using a computer comprising the steps of: A) storing in a primary storage region, multiple groups of data including attribution items having predetermined structure, without destroying the structure of the data stored; B) storing in a secondary storage region, auxiliary data for the data groups with attribution items, showing the location of the data for search purposes; and C) accepting into the primary storage region, newly entered groups of data with attribution items, appending the newly entered data groups, matching attribution items from the data groups, appending auxiliary data for the attribution items, appending location data for search purposes, and appending auxiliary data for attribution items not present. In this way, multiple data groups in which each of the attribution items is determined structurally can be stored without destroying the structure. All appended data groups can also be stored without destroying their structures.

9) In accordance with characteristics of the present invention, there is provided a method of searching data using a computer comprising the steps of: A) storing in a primary storage region, multiple groups of data including attribution items having predetermined structure, without destroying the structure of the data stored; B) storing in a secondary storage region, auxiliary data for the data groups with attribution items, showing the location of the data for search purposes; and C) searching multiple groups of data stored in the primary storage region with reference to auxiliary search data when a search command including attribution items to be searched is provided. Thus, a high-speed data search for desired data existing in data groups in which each of the attribution items is defined structurally can be performed by conducting search using the auxiliary data for searching.

12) Also, in accordance with characteristics of the present invention, there is provided a data storing medium including a data structure comprising the following regions: A) a data group storage region for storing a plurality of data groups in which data as to a plurality of attribution items being stored and each of the attribution items being defined structurally without destroying the structure; and B) an auxiliary data storage region for storing auxiliary data representing correspondence of position information of data belonging to each of the attribution items in the plurality of data groups to the attribution item. In this way, a high-speed search can be performed by using the auxiliary data even when multiple data groups in which each of the attribution items is determined structurally without destroying the structure thereof.

In the embodiments described above, XML data is employed as an example of "extensibly descriptively attributed data ", any other "extensible descriptively attributed data" may be used therefor.

Furthermore, the method for appending attribution items may be a method other than using tags such as used with XML data.

While the embodiments of the present invention, as disclosed herein, constitute preferred forms, it is to be understood that each term was used as illustrative and not restrictive, and can be changed within the scope of the claims without departing from the scope and spirit of the invention.

What is claimed is:

1. A data storing medium including a data structure comprising the following regions:

A) a data group storage region for storing multiple groups of data including attribution items having predetermined structure, without destroying the structure of the data stored; and B) an auxiliary data storage region for storing auxiliary data for the groups of data with attribution items, showing the location of the data for search purposes, the auxiliary data storage region storing attribution items not matching those present in the primary storage region, with their associated auxiliary data.

* * * * *